(12) United States Patent
Gentils et al.

(10) Patent No.: US 8,419,352 B2
(45) Date of Patent: Apr. 16, 2013

(54) BYPASS TURBOJET

(75) Inventors: Romuald Gentils, Ozoir (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 1141 days.

(21) Appl. No.: 12/475,619

(22) Filed: Jun. 1, 2009

(65) Prior Publication Data
US 2010/0047059 A1   Feb. 25, 2010

(30) Foreign Application Priority Data

Jun. 9, 2008 (FR) ...................................... 08 53807

(51) Int. Cl.
*F01D 17/00* (2006.01)

(52) U.S. Cl.
USPC ..... 415/144; 415/200; 415/213.1; 415/214.1; 415/208.3; 415/199.6; 60/785; 60/796

(58) Field of Classification Search .......... 415/144–145, 415/200, 213.1, 214.1, 208.3, 208.4, 199.6; 60/782, 785, 226.1, 796
See application file for complete search history.

(56) References Cited

U.S. PATENT DOCUMENTS

| 3,357,176 | A | | 12/1967 | Williams | |
|---|---|---|---|---|---|
| 3,823,553 | A | * | 7/1974 | Smith | 415/213.1 |
| 4,112,677 | A | | 9/1978 | Kasmarik | |
| 5,237,817 | A | * | 8/1993 | Bornemisza et al. | 60/226.1 |
| 5,619,850 | A | * | 4/1997 | Palmer et al. | 60/785 |
| 6,647,730 | B2 | * | 11/2003 | Liu | 60/782 |
| 7,059,136 | B2 | * | 6/2006 | Coffinberry | 60/785 |
| 8,057,157 | B2 | * | 11/2011 | Roush et al. | 415/1 |
| 2004/0009060 | A1 | * | 1/2004 | Romani et al. | 415/143 |
| 2005/0178105 | A1 | | 8/2005 | Kawamoto et al. | |
| 2007/0144139 | A1 | | 6/2007 | Kawamoto et al. | |

FOREIGN PATENT DOCUMENTS

| FR | 2545538 | 11/1984 |
|---|---|---|
| GB | 2139292 | 11/1984 |
| WO | WO 02/29252 | 4/2002 |
| WO | WO 2005/012696 | 2/2005 |

* cited by examiner

*Primary Examiner* — Christopher Verdier
(74) *Attorney, Agent, or Firm* — Oblon, Spivak, McClelland, Maier & Neustadt, L.L.P.

(57) ABSTRACT

A bypass turbojet engine including an outer fan duct and an inner fan duct (IFD), between which the secondary flow passes, and a high pressure compressor having an outer casing is disclosed. The IFD is fastened on the outer casing.

10 Claims, 3 Drawing Sheets

BYPASS TURBOJET

FIELD OF THE INVENTION

The invention relates to a bypass turbojet engine comprising an outer fan duct (OFD) and an inner fan duct (IFD) between which the secondary flow (air stream) or cold flow (bypass thrust) passes, and also having a high pressure compressor including an outer casing.

The OFD and the IFD perform a purely aerodynamic function of guiding the secondary flow, and possibly also an acoustic function if they are coated in appropriate treatments. Consequently, the OFD and the IFD are usually made of light material, presenting low density, such as aluminum or composite materials (e.g. epoxy resin optionally filled with fibers)

BACKGROUND OF THE INVENTION

Document FR 2 545 538 illustrates this prior art situation.

The OFD and the IFD present a segment surrounding the high pressure compressor, which is itself enclosed in its outer casing.

Thermal and mechanical optimization of the structures of the engine often lead to seeking a high level of stiffness for the high pressure compressor in order to guarantee small clearances at the tips of the blades.

It is therefore necessary to find a compromise between requirements for stiffness and requirements for low weight. Thus, increasing the thickness of the outer casing leads to an increase in its weight, so this technique for increasing the stiffness of the casing rapidly reaches its limit.

This compromise is particularly difficult to find with small engines (fan diameter less than 40 inches or 1 meter) with a compressor that is of the axial-centrifugal type. Under such circumstances, a portion of the outer casing of the high pressure compressor has a radius that is relatively large, such that the thickness of the outer casing has a major impact on the second moment of area or moment of inertia of the engine.

OBJECT AND SUMMARY OF THE INVENTION

An object of the present invention is to provide a solution enabling the drawbacks of the prior art to be overcome, and in particular making it possible to stiffen the outer casing of the high pressure compressor without prejudicing its weight.

To this end, according to the present invention, the IFD is fastened on the outer casing, i.e. on the downstream stator, and preferably on the downstream end of the outer casing.

In this way, it can be understood that by providing fastening that makes a mechanical connection between the IFD and the outer casing, the IFD is used as a structural element in an assembly that includes the outer casing.

Overall, by means of the solution of the present invention, it is possible to improve the mechanical cohesion and stiffness of the assembly including the outer casing, but without prejudicing the weight of this assembly, since use is made of the already-existing IFD.

According to the invention, it can be understood that the IFD performs a novel function, namely that of forming a structural element of the assembly that includes the outer casing.

As a result, it will be understood that the IFD needs to be made of a material that imparts sufficient mechanical strength thereto.

Thus, the IFD is preferably made essentially out of a metal that presents a ratio of breaking strength over density that is greater than 0.1 megapascals per kilogram per cubic meter ($MPa \cdot m^3 \cdot kg^{-1}$).

BRIEF DESCRIPTION OF THE DRAWINGS

Other advantages and characteristics of the invention appear on reading the following description made by way of example and with reference to the accompanying drawings, in which.

MORE DETAILED DESCRIPTION

In the present specification, upstream and downstream are defined relative to the normal flow direction of gas (from upstream to downstream) through the turbojet engine. The axis of the turbojet engine is the axis of rotation of the rotor of the turbojet engine. The axial direction corresponds to the direction of the axis of the turbojet engine and a radial direction is a direction perpendicular to said axis. The adjectives "outer" and "inner" are used relative to a radial direction, with a face or an element being considered to be "inner" when it is closer to the axis of the turbojet engine than a face or an element of the same assembly that is considered to be "outer".

Figure 1:
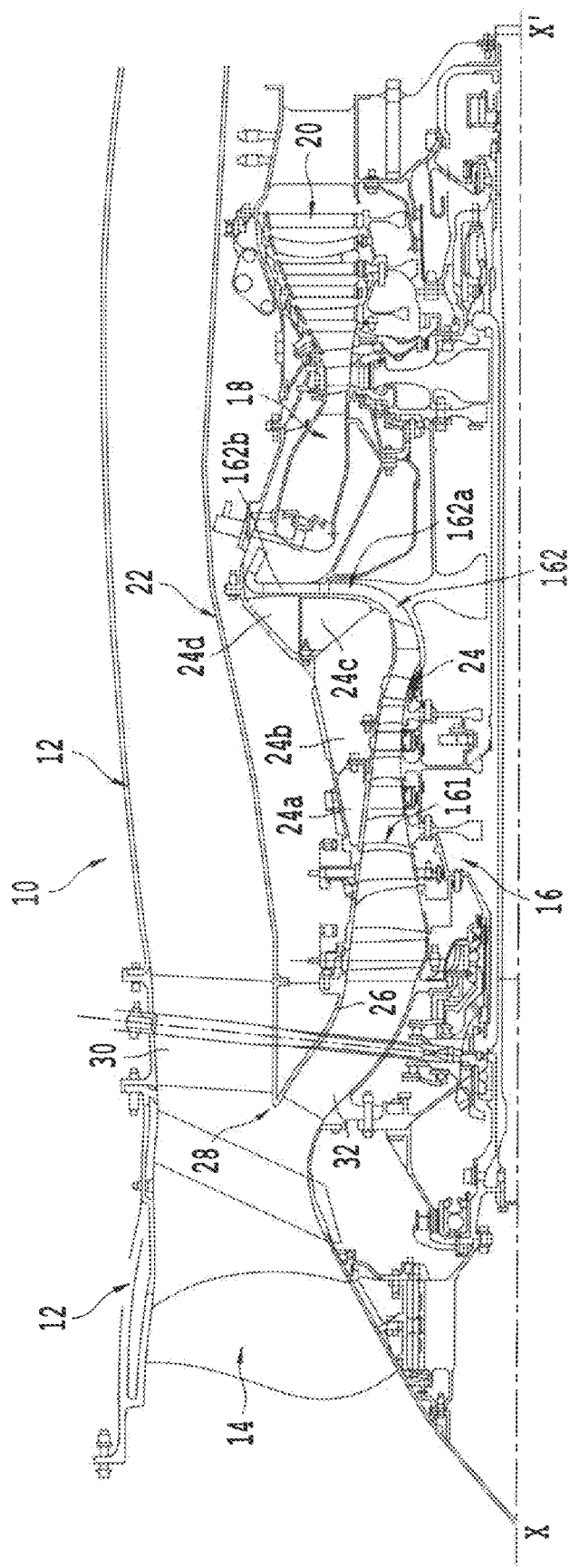
FIG. 1 is an axial half-section view of a prior art example of a bypass turbojet engine showing diagrammatically the outer fan duct (OFD) and the inner fan duct (IFD)

FIG. 1 shows part of a prior art two-spool bypass turbojet engine 10 of axis X-X' that conventionally comprises an outer fan duct (OFD) 12 (shown diagrammatically), also referred to as a peripheral nacelle, and containing from left to right in FIG. 1 (i.e. from upstream to downstream relative to the flow of air from front to rear), in succession: a fan 14; a high pressure compressor 16 of the axial-centrifugal type; a combustion chamber 18; and a high pressure turbine 20.

The compressor 16, the combustion chamber 18, and the turbine 20 are housed in an inner fan duct (IFD) 22 (shown diagrammatically) that co-operates with the OFD 12 to define an outer annular air passage for the secondary flow or cold flow that is expanded in the nozzle (not shown).

The outer casing 24 that forms the outer casing of the high pressure compressor 16 has its upstream end connected by means of an annular flange to an intermediate casing 26.

The intermediate casing 26 includes a separator tip 28 that acts downstream from the fan 14 to separate the air flow into a primary air flow and a secondary air flow. The primary air flow travels along an inner annular air passage or primary duct, penetrating into the high pressure compressor 16 via inlet guide vanes 32. The secondary air flow is deflected by the separator tip 28 into an outer annular air passage (secondary duct) flowing towards outlet guide vanes 30 and then towards the outlet nozzle of the engine.

The high pressure compressor 16 of the axial-centrifugal type comprises an axial portion 161 provided with bladed disks comprising stator disks and rotor disks in alternation, and a radial portion 162 formed, going from upstream to downstream, by an impeller 162a and a diffuser 162b.

It should be observed that the outer casing 24 carries four axially symmetrical cavities or chambers 24a, 24b, 24c, and 24d for bleeding air and following on from one another in adjoining pairs all along a downstream segment of the outer casing 24, covering two-thirds of the axial portion 161 and all of the radial portion 162.

As can be seen in FIG. 1, the outer casing 24 and the IFD 22 are independent from each other, and an annular space exists between the outer end of the radial portion 162 of the high pressure compressor 16 and the IFD 22. In certain prior art configurations (not shown), contact may exist between the radial portion 162 of the high pressure compressor 16 and the IFD 22.

Figure 2:
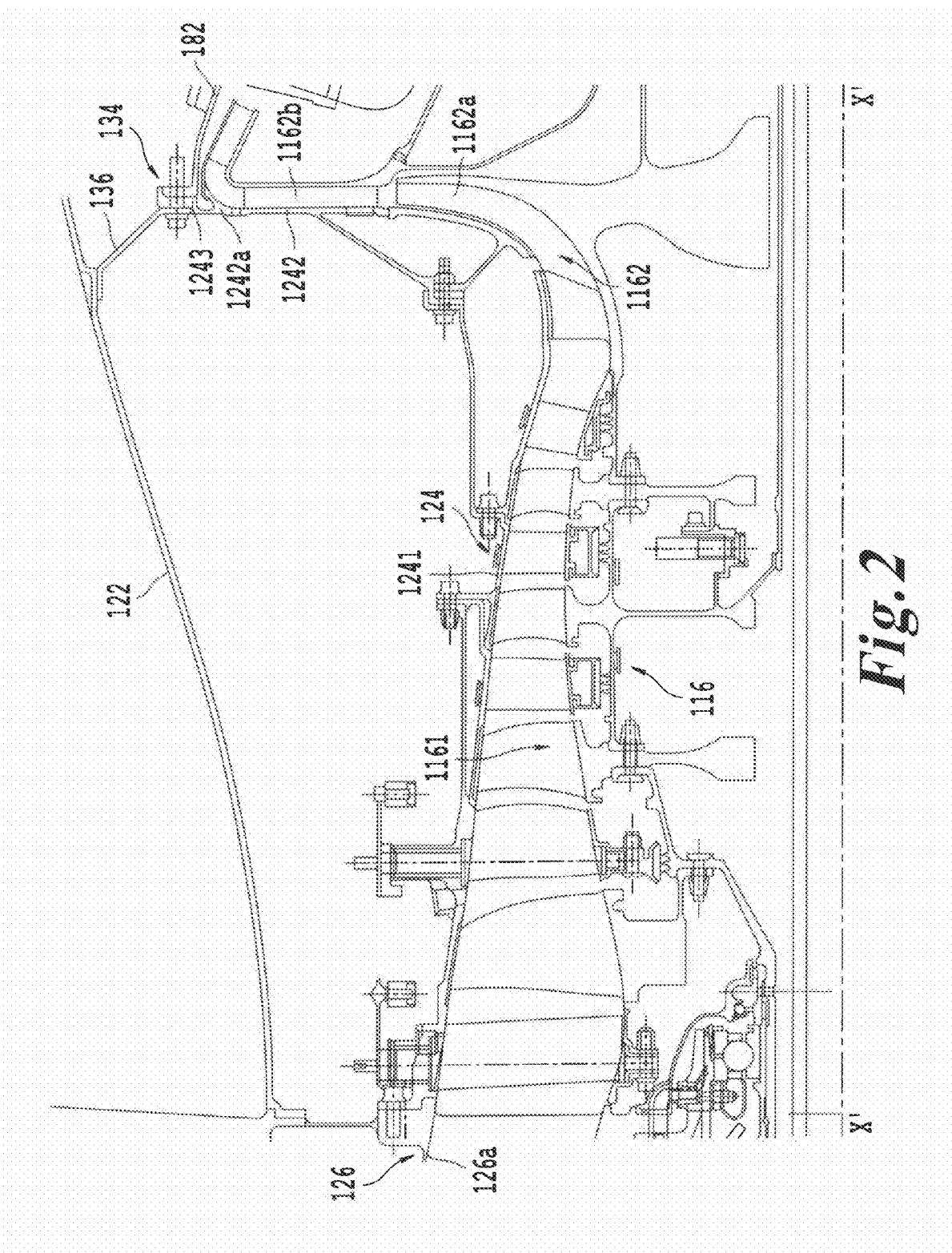
FIG. 2 is an axial half-section of the compressor, the diffuser, and the IFD according to an embodiment of the invention.

Reference is now made to FIG. 2 showing an embodiment of the invention, in a fragmentary axial half-section view, extending axially over the full extent of the high pressure compressor 16, and extending radially from the axis X-X' to the IFD 22.

The elements of FIG. 2 that are identical to elements in FIG. 1 are given identical reference signs plus the value 100.

There can be seen the axial-centrifugal type high pressure compressor 116 with an axial portion 1161 having alternating stator and rotor bladed disks, and a radial portion 1162 formed, from upstream to downstream, by an impeller 1162a and a diffuser 1162b.

The outer casing 124 of the high pressure compressor 116 has an upstream axial portion 1241 along the bladed disks and a downstream radial portion 1242 along the impeller 1162a and the diffuser 1162b.

According to the invention, the IFD 122 is fastened on the radial portion 1242 of the outer casing 124, and more particularly on the downstream end 1242a extending along the diffuser 1162b.

At its downstream end 1242a, the radial portion 1242 of the outer casing 124 presents a downstream flange 1243 that conventionally connects the radial portion 1242 of the outer casing 124 to a casing 182 surrounding the combustion chamber 18, via a bolted connection 134.

As can be seen in FIG. 2, provision is advantageously made for the IFD 122 to be fastened to the downstream flange 1243 by means of an end plate 136.

In this way, the IFD 122 is bolted to the downstream end 1242a of the outer casing 124.

Thus, advantage is taken of the proximity between the IFD 122 and the downstream flange 1243.

In addition, the small amount of material added for the end plate 136, which may be perforated, is not significant.

In a preferred embodiment of the invention, the IFD 122 is made essentially out of titanium.

Alternatively, for the material constituting the IFD 122 it is possible to use other rigid materials, preferably that presents a satisfactory compromise between breaking strength and density (ratio of breaking strength over density being greater than 0.1 MPa·m$^3$·kg$^{-1}$) and that can withstand temperatures close to 300° C. or 400° C., and in particular it is possible to use other metal alloys. By way of example, mention can be made of highly alloyed martensitic steels (17-4 PH) or even light alloys based on aluminum and already used for the OFD (AU2GN), in association with lagging.

As in the prior art, the turbojet engine also includes an intermediate casing 126 that extends the outer casing 124 of the high pressure compressor 116 upstream and the IFD 122 is fastened, preferably bolted, to the downstream end 126a of said intermediate casing 126.

In this way, between the IFD 122 and the outer casing 124 there is constituted a structural assembly that can be up to twice as rigid as is the outer casing 24 in the prior art.

Furthermore, in a preferred disposition of the invention, the outer casing 124 has a plurality of axially symmetrical chambers 124a, 124b, and 124c for bleeding air, with at least one of these chambers being situated apart from the other chambers.

Preferably, the outer casing 124 has three axially symmetrical chambers 124a, 124b, and 124c for bleeding air.

Figure 3:
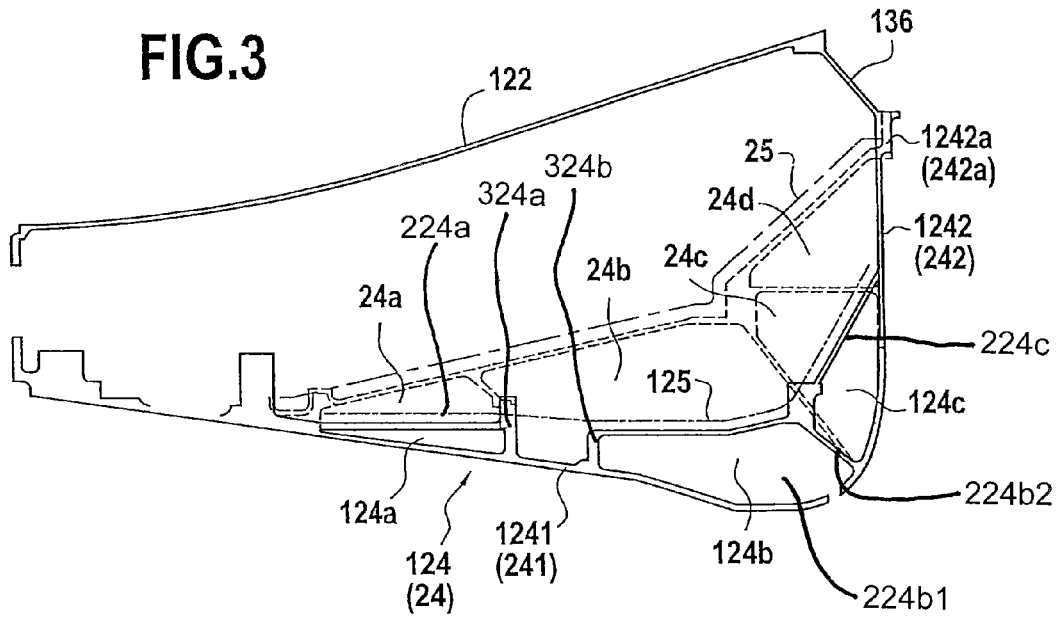
FIG. 3 is a diagrammatic axial half-section view of the outer fan duct of the compressor, the IFD, and the axially-symmetrical chambers defined between them, as in the prior art (dashed lines), and in accordance with the invention (continuous lines)

In the prior art, as can be seen in FIG. 1 and in dashed lines in FIG. 3, the axially symmetrical chambers 24a, 24b, 24c, and 24d for bleeding air co-operate with the outer casing 24 to constitute a set of boxes. Under such circumstances, since the four chambers 24a, 24b, 24c, and 24d follow one another, being adjacent to one another in pairs, their outline 25 (chain-dotted lines in FIG. 3) constitutes substantially a straight line between the upstream first third of the axial portion 1241 of the outer casing 124 and the downstream end 1242a of the radial portion 1242 of the outer casing 124.

This is made possible by the fact that the first two chambers 24a and 24b present axial sections that are respectively triangular and quadrilateral in shape, and run along the axial portion 241 of the outer casing 24, and by the fact that the other two chambers 24c and 24d, present axial sections of triangular shape, and run along the radial portion 242 of the outer casing 24, whereas the second, third, and fourth chambers 24b, 24c, and 24d present a vertex in common in axial section.

Such an arrangement of the chambers 24a, 24b, 24c, and 24d contribute to stiffening the outer casing 24.

In the invention, because of the increase in stiffness created by the connection between the IFD 122 and the downstream end 1242a of the outer casing 124, partitioning of the air bleed chambers for stiffening the outer casing 124 is no longer necessarily structural, or it may contribute to a smaller extent to stiffening the assembly constituted by the IFD 122 and the outer casing 124.

Figure 4:
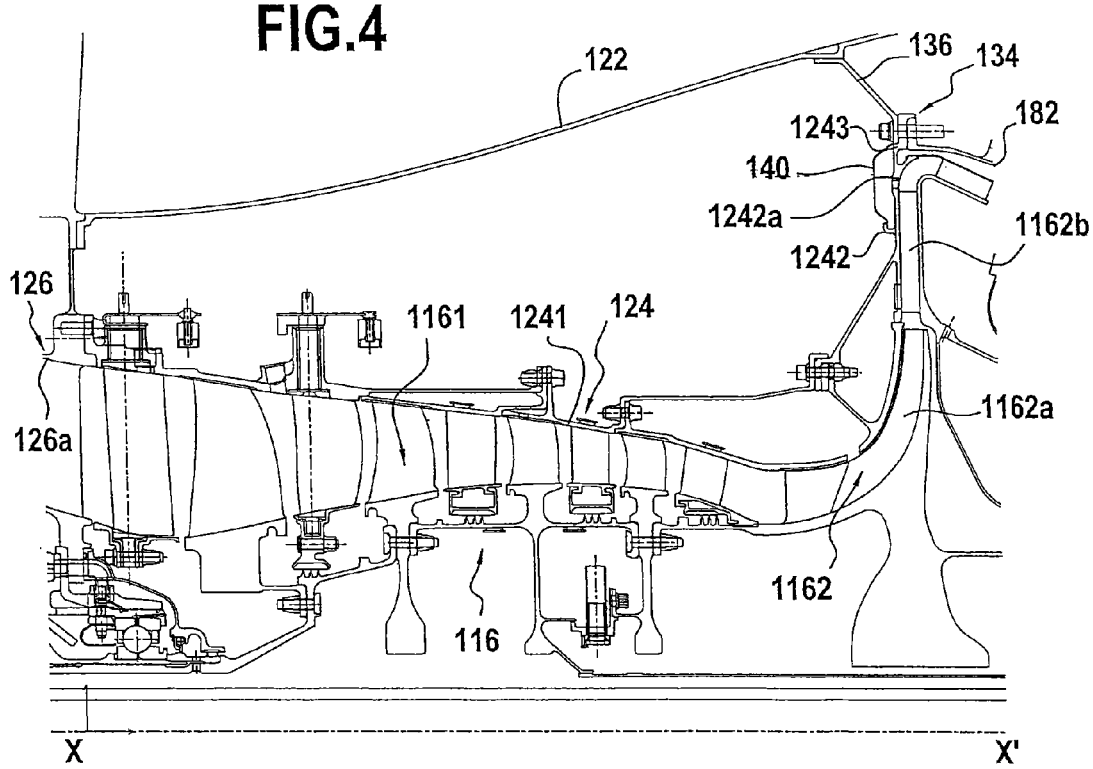
FIG. 4 is similar to FIG. 2 for a variant embodiment.

That is why, as can be seen in FIGS. 2 to 4, the three chambers 124a, 124b, and 124c are not all contiguous or mutually touching, and they do not run on one from the other all along the axis.

In the embodiment shown, the three chambers 124a, 124b, and 124c comprise: an upstream, first chamber 124a that is separated from the other two chambers 124b and 124c and that is disposed along the axial portion 241 of the outer casing 24; an intermediate, second chamber 124b that extends along the axial portion 241 of the outer casing 24, being spaced apart from the first chamber 124a; and a downstream, third chamber 124c that is adjacent to the second chamber 124b and that extends along the radial portion 242 of the outer casing 24.

Specifically, in axial section, the first chamber 124a is of triangular shape and runs along a central segment of the axial portion 1241 of the outer casing 24, the second chamber 124b is of quadrilateral shape and runs along a downstream segment of the axial portion 1241 of the outer casing 24, and the third chamber 124c is of triangular shape and runs along an upstream segment of the radial portion 1242 of the outer casing 24, with one side of its axial section and one vertex being in common with the second chamber 124b.

Furthermore, as can be seen in FIG. 3, the outline 125 (chain-dotted lines in FIG. 3) of these three chambers 124a, 124b, and 124c, as defined by annular ribs 224a, 224b1, 224b2, 224c, and radial flanges 324a, 324b, is very close to the outline of the casing 124 in terms of distance and profile: this outline 125 is much closer to the outline of the casing 124 than is the outline 25 of the prior art.

According to the invention, which provides a structural assembly with the IFD 122 and the outer casing 124, in order to maintain an outline 125 that is "low", i.e. very close to the outline of the casing 124, it might be necessary to move some of the air bleed points, and in particular those (not shown) that are situated level with the diffuser 1162a of the impeller.

If this modification is not possible, it is also possible to conserve the same air bleed points as in the prior art, and to add an air manifold 140 as shown in FIG. 4, i.e. downstream from the third chamber 124c, facing the downstream end 1242a of the radial portion 1242 of the outer casing 124.

What is claimed is:

1. A bypass turbojet engine comprising:
   an outer fan duct and an inner fan duct between which secondary flow passes; and
   a high pressure compressor including an outer casing including an upstream axial portion along bladed disks of the high pressure compressor and a downstream radial portion along an impeller and a diffuser of the high pressure compressor,
   wherein the inner fan duct is fastened on the outer casing,
   wherein the outer casing carries a plurality of axially symmetrical air-bleed chambers defined by annular ribs, a first upstream chamber being situated apart from the other chambers, the other chambers including a second intermediate chamber and a third downstream chamber,
   wherein the first chamber runs along a central segment of the axial portion of the outer casing and is defined by a first radial flange at a downstream end of the first chamber and a first substantially axially extending annular rib,
   wherein the second chamber runs along a downstream segment of the axial portion of the outer casing and is defined by a second radial flange at an upstream end of the second chamber, a second substantially axially extending annular rib, and a third annular rib,
   wherein the third chamber runs along an upstream segment of the radial portion of the outer casing and is defined by the third annular rib and a fourth annular rib, and
   wherein the first radial flange is disposed axially upstream of the second radial flange on the axial portion of the outer casing.

2. A turbojet engine according to claim 1, wherein the inner fan duct is fastened on a downstream end of the outer casing.

3. A turbojet engine according to claim 1, wherein the inner fan duct is made essentially out of a metal presenting a ratio of breaking strength to density that is greater than 0.1 $MPa \cdot m^3 \cdot kg^{-1}$.

4. A turbojet engine according to claim 1, wherein the inner fan duct is made essentially out of titanium.

5. A turbojet engine according to claim 1, wherein the inner fan duct is bolted to a downstream end of the outer casing.

6. A turbojet engine according to claim 1, further comprising an intermediate casing extending the outer casing of the high pressure compressor upstream, and wherein the inner fan duct is fastened on a downstream end of said intermediate casing.

7. A turbojet engine according to claim 1, wherein the high pressure compressor is of the axial-centrifugal type, and wherein the inner fan duct is fastened on the radial portion of the outer casing.

8. A turbojet engine according to claim 7, wherein the radial portion of the outer casing presents a downstream flange at its end situated downstream, and wherein the inner fan duct is fastened on the downstream flange.

9. A turbojet engine according to claim 1, wherein an air manifold is provided downstream of the third chamber and faces a downstream end of the radial portion of the outer casing.

10. A bypass turbojet engine comprising:
    an outer fan duct and an inner fan duct between which secondary flow passes; and
    a high pressure compressor including an outer casing including an upstream axial portion along bladed disks of the high pressure compressor and a downstream radial portion along an impeller and a diffuser of the high pressure compressor,
    wherein the inner fan duct is fastened on the outer casing,
    wherein the outer casing has three axially symmetrical air-bleed chambers, the three chambers comprising a first upstream chamber separate from the other chambers and extending along a central segment of the axial portion of the outer casing, a second intermediate chamber extending along a downstream segment of the axial portion of the outer casing and spaced apart from the first chamber, and a third downstream chamber adjacent to the second chamber and extending along an upstream segment of the radial portion,
    wherein the first chamber is defined by a first radial flange at a downstream end of the first chamber and a first substantially axially extending annular rib,
    wherein the second chamber is defined by a second radial flange at an upstream end of the second chamber, a second substantially axially extending annular rib, and a third annular rib,
    wherein the third chamber is defined by the third annular rib and a fourth annular rib, and
    wherein the first radial flange is disposed axially upstream of the second radial flange on the axial portion of the outer casing.

* * * * *